US012678728B2

(12) United States Patent
Zaabout et al.

(10) Patent No.: US 12,678,728 B2
(45) Date of Patent: Jul. 14, 2026

(54) GAS CAPTURE SYSTEM WITH COMBINED TEMPERATURE AND PRESSURE SWINGS USING MOVING ADSORBENT

(71) Applicant: SINTEF TTO AS, Trondheim (NO)

(72) Inventors: Abdelghafour Zaabout, Trondheim (NO); Schalk Cloete, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 699 days.

(21) Appl. No.: 18/042,838

(22) PCT Filed: Aug. 10, 2021

(86) PCT No.: PCT/EP2021/072259
§ 371 (c)(1),
(2) Date: Feb. 24, 2023

(87) PCT Pub. No.: WO2022/043050
PCT Pub. Date: Mar. 3, 2022

(65) Prior Publication Data
US 2023/0330589 A1      Oct. 19, 2023

(30) Foreign Application Priority Data
Aug. 27, 2020     (GB) ...................................... 2013429

(51) Int. Cl.
*B01D 53/02*          (2006.01)
*B01D 53/12*          (2006.01)
(52) U.S. Cl.
CPC ........ *B01D 53/12* (2013.01); *B01D 2257/504* (2013.01); *B01D 2258/0283* (2013.01); *B01D 2259/4009* (2013.01)
(58) Field of Classification Search
CPC ...... B01D 2257/504; B01D 2258/0283; B01D 2259/4009; B01D 53/0462; B01D 53/08; B01D 53/12; Y02C 20/40
See application file for complete search history.

(56) References Cited

U.S. PATENT DOCUMENTS 4,857,285 A      8/1989 Gal
5,026,528 A *    6/1991 Gal ......................... C01B 17/20
                                                        422/111
(Continued)

FOREIGN PATENT DOCUMENTS

KR     1020140077466 A      6/2014
WO        03084656 A1    10/2003
(Continued)

OTHER PUBLICATIONS

Notification of Transmittal of The International Search Report and the Written Opinion of the International Searching Authority, or the Declaration for International Application No. PCT/EP2021/072259, "Gas Capture System With Combined Temperature and Pressure Swings Using Moving Adsorbent", date of mailing: Nov. 24, 2021.
(Continued)

*Primary Examiner* — Christopher P Jones
(74) *Attorney, Agent, or Firm* — Hamilton, Brook, Smith & Reynolds, P.C.

(57)                    ABSTRACT

Disclosed herein is a gas capture system comprising: a first reactor system arranged so that, in the first reactor system, at least some gas in a gas stream that is received by the gas capture system is captured by a sorbent that is arranged to flow through the first reactor system; a second reactor system arranged to regenerate the sorbent so that the sorbent releases at least some of the gas captured in the first reactor system, wherein the sorbent is arranged to flow through the second reactor system and the second reactor system is arranged to output a flow of the released gas; a first sorbent transfer system arranged between a sorbent outlet of the first reactor system and a sorbent inlet of the second reactor system, wherein the first sorbent transfer system comprises a lock hopper; and a second sorbent transfer system arranged between a sorbent outlet of the second reactor system and a sorbent inlet of the first reactor system, wherein the second (Continued)

sorbent transfer system comprises a lock hopper; wherein: the sorbent is a solid; the second reactor system comprises a pump arranged so that the second reactor system may have a lower operational pressure when regenerating sorbent than the operational pressure of the first reactor system during gas capture by the sorbent; and the first reactor system, first sorbent transfer system, second reactor system and second sorbent transfer system are all arranged so that they provide a sorbent flow path that recirculates the sorbent between the first reactor system and the second reactor system.

19 Claims, 5 Drawing Sheets

(56)                References Cited

U.S. PATENT DOCUMENTS

| | | | |
|---|---|---|---|
| 5,336,300 A | | 8/1994 | Yoshino et al. |
| 6,207,023 B1 * | | 3/2001 | Cha ........................ B01D 53/86 |
| | | | 204/157.43 |
| 8,500,854 B1 * | | 8/2013 | Pennline ................ B01D 53/06 |
| | | | 95/146 |
| 2012/0258029 A1 | | 10/2012 | Krutka |
| 2014/0030154 A1 * | | 1/2014 | Leininger ................. C01B 3/56 |
| | | | 422/619 |

| | | | |
|---|---|---|---|
| 2014/0331864 A1 | | 11/2014 | Ogino et al. |
| 2016/0347611 A1 * | | 12/2016 | Mays ................... B01D 53/047 |
| 2020/0156796 A1 | | 5/2020 | Bartosz et al. |
| 2021/0187438 A1 * | | 6/2021 | Nishibe ................. B01D 53/83 |
| 2021/0229032 A1 * | | 7/2021 | Yamamoto ............. B01D 53/62 |
| 2024/0399290 A1 * | | 12/2024 | Zaabout ............. B01D 53/1412 |

FOREIGN PATENT DOCUMENTS

| | | |
|---|---|---|
| WO | 2012055715 A2 | 5/2012 |
| WO | 2019232626 A1 | 12/2019 |
| WO | 2020165440 A1 | 8/2020 |

OTHER PUBLICATIONS

Search Report for GB Application No. 2013429.2, "Gas capture system with combined temperature and pressure swings", date of search: Sep. 29, 2020.

Cloete, S., et al., Economic assessment of the swing adsorption reactor cluster for CO2 capture from cement production. Journal of Cleaner Production, 2020. 275: p. 123024.

Dietrick, F., et al., "Experimental Study of the adsorber performance in a multi-stage fluidized bed system for continuous CO2 capture by means of temperature swing", Fuel Processing Technology 173 (2018) 103-111.

* cited by examiner

Fig. 2C

GAS CAPTURE SYSTEM WITH COMBINED TEMPERATURE AND PRESSURE SWINGS USING MOVING ADSORBENT

This application is the U.S. National Stage of International Application No. PCT/EP2021/072259, filed Aug. 10, 2021, which designates the U.S., published in English, and claims priority under 35 U.S.C. § 119 or 365(c) to Great Britain Application No. 2013429.2, filed Aug. 27, 2020. The entire teachings of the above applications are incorporated herein by reference.

FIELD

The present disclosure relates to a gas capture system. A gas capture system is disclosed in which gas is captured by a solid sorbent. The sorbent is re-circulated between a first reactor system and a second reactor system. In the first reactor system, the sorbent captures a gas in a gas stream in an exothermic process. In the second reactor system, the sorbent is regenerated and the captured gas is released in an endothermic process. The second gas capture system is operated at a lower pressure than the first gas capture system. A heat pump is used to transfer heat from the first reactor system to the second reactor system.

BACKGROUND

There is a lot of environmental pressure to reduce the emissions of carbon dioxide gas into the atmosphere. A known technology for greatly reducing the carbon dioxide released into the atmosphere is carbon capture and storage, CCS. A post-combustion carbon dioxide capture, PCCC, system may remove carbon dioxide from a flue gas generated by carbon, or hydrocarbon, combustion prior to the flue gas being released into the atmosphere. A PCCC system may be retrofitted to an existing flue gas source, such as a fossil fuel-fired power plant or combustion engine, in order for CCS to be implemented.

PCCC systems may more generally be used to remove carbon dioxide from any type of gas. In particular, a PCCC may be used to remove carbon dioxide from a gas produced by heating a raw material (that $CO_2$ may be a component of), such as the gasses produced in cement, phosphate rock and magnesium oxide production processes.

In a PCCC system, a solid sorbent, or liquid solvent, is used to capture, e.g. adsorb/absorb, carbon dioxide from a gas. A known liquid solvent is monoethanolamine, MEA. PCCC systems that use solvents are appropriate for low temperature carbon dioxide capture applications. Problems experienced by solvents are low energy efficiency and high cost. In addition, there are also environmental concerns resulting from the general use of amines.

The use of solid sorbents is preferable over fluid sorbents because the energy efficiency is improved and the above-identified environmental concerns are avoided. It is known for solid sorbents to be implemented in a fixed bed reactor. Problems with fixed bed reactors for gas capture applications may include the capital cost being high and the reactors not being suitable for the capture of large volumes of gas. In fixed bed reactors there may also be a large pressure drop and hot spots/waves that reduce the lifetime of the sorbent and the working capacity. A large reactor volume and footprint is therefore required and this increases the capital cost of the technology.

There is a general need to improve known CCS systems. More generally, there is a need to improve gas capture systems across a plurality of applications, including the capture of gasses other than carbon dioxide.

SUMMARY

According to an aspect of the invention, there is provided a gas capture system comprising: a first reactor system arranged so that, in the first reactor system, at least some gas in a gas stream that is received by the gas capture system is captured by a sorbent that is arranged to flow through the first reactor system; a second reactor system arranged to regenerate the sorbent so that the sorbent releases at least some of the gas captured in the first reactor system, wherein the sorbent is arranged to flow through the second reactor system and the second reactor system is arranged to output a flow of the released gas; a first sorbent transfer system arranged between a sorbent outlet of the first reactor system and a sorbent inlet of the second reactor system, wherein the first sorbent transfer system comprises a lock hopper; and a second sorbent transfer system arranged between a sorbent outlet of the second reactor system and a sorbent inlet of the first reactor system, wherein the second sorbent transfer system comprises a lock hopper; wherein: the sorbent is a solid; the second reactor system comprises a pump arranged so that the second reactor system has a lower operational pressure when regenerating sorbent than the operational pressure of the first reactor system during gas capture by the sorbent; and the first reactor system, first sorbent transfer system, second reactor system and second sorbent transfer system are all arranged so that they provide a sorbent flow path that recirculates the sorbent between the first reactor system and the second reactor system.

Preferably, the gas capture system further comprises a heat pump system arranged to transfer heat between the first reactor system and the second reactor system; wherein the second reactor system is arranged to regenerate the sorbent by heating the sorbent with heat received from at least the heat pump system.

Preferably, in the first reactor system, the sorbent is in a substantial counter flow with the gas stream.

Preferably, the first reactor system comprises a plurality of reactors configured to provide mass transfer between a gas stream and the sorbent; the gas stream is arranged to flow through each reactor; and the sorbent is arranged to flow through each reactor. Adjacent reactors may be separated by a perforated plate.

Preferably, the first reactor system comprises a counter current fluidised bed reactor.

Preferably, the lock hopper of the first sorbent transfer system comprises: an upstream valve; a chamber; and a downstream valve; wherein: the upstream valve is arranged between the chamber and the sorbent outlet of the first reactor system; the downstream valve is arranged between the chamber and the sorbent inlet of the second reactor system; the lock hopper is operable so that when the upstream valve is open and the downstream valve is closed, sorbent is arranged to flow from the first reactor system into the chamber; and when the upstream valve is closed and the downstream valve is open, sorbent is arranged to flow from the chamber to the second reactor system.

Preferably, the lock hopper of the second sorbent transfer system comprises: an upstream valve; a chamber; and a downstream valve; wherein: the upstream valve is arranged between the chamber and the sorbent outlet of the second reactor system; the downstream valve is arranged between the chamber and the sorbent inlet of the first reactor system; the lock hopper is operable so that when the upstream valve is open and the downstream valve is closed, sorbent is arranged to flow from the second reactor system into the chamber; and when the upstream valve is closed and the downstream valve is open, sorbent is arranged to flow from the chamber to the first reactor system.

Preferably, the lock hopper of the second sorbent transfer system further comprises a pump; and the lock hopper is operable so that when the upstream valve is closed and the downstream valve is closed, the pump removes at least some of the gas from the chamber.

Preferably, the gas capture system further comprises: a gas inlet arranged to receive the gas stream; a first gas outlet arranged to output the gas stream that has flowed through the first reactor system; and a second gas outlet arranged to output a flow of gas generated in the second reactor system.

Preferably, the heat pump system is arranged to recirculate a fluid between a reaction region in the first reactor system and a regeneration region in the second reactor system such that heat is transferred from the reaction region to the regeneration region.

Preferably, the heat pump system comprises a compressor arranged to compress the recirculated fluid.

Preferably, the operational temperature of the second reactor system when the sorbent is regenerated is higher than the operation temperature of the first reactor system when the gas is captured.

Preferably, the first reactor system is configured to react sorbent with the gas stream at an operational temperature in a range of about 40° C. to 90° C., and preferably about 50° C. to 70° C., and more preferably 60° C.

Preferably, the second reactor system is configured to regenerate sorbent at an operational temperature in a range of about 40° C. to 130° C., and preferably about 60° C. to 90° C., and more preferably about 80° C.

Preferably, the operational pressure of the second reactor system is a substantial vacuum.

Preferably, the operational pressure of the second reactor system is in a range of about 0.001 bar to 0.8 bar.

Preferably, the operational pressure of the first reactor system is in a range of about 0.9 bar to 1.1 bar.

Preferably, the sorbent comprises polyethylenimine, and/or the sorbent is a metal organic framework based sorbent. The sorbent may comprise one or more of zeolite, activated carbon, 3D graphene, any substance for chemi-, phys-sorption and/or hydrids of these. The particle size of the sorbent may be in the range 100 μm to 1000 μm.

Preferably, the gas stream is a gas mixture.

Preferably, the received gas stream by the gas capture system comprises carbon dioxide.

Preferably, the received gas stream by the gas capture system is a flue gas.

Preferably, the received gas stream by the gas capture system is a gas mixture generated by a reforming process.

Preferably, the gas captured by the sorbent is carbon dioxide.

Preferably, the gas captured by the sorbent is one or more of hydrogen sulphide, SOx, hydrogen and NOx.

Preferably, the gas capture system further comprises a control system for controlling the operational temperature and/or pressure of the first reactor system and the second reactor system.

Preferably, in use, phase changes of the working fluid that is recirculated by the first heat pump system occur in a reaction region in the first reactor system and in a regeneration region of the second reactor system.

Preferably, the phase changes of the working fluid occur at a substantially constant temperature.

Preferably, the gas capture system further comprises a steam inlet arranged to receive a flow of low pressure steam, that can be generated at a low temperature, so that steam may be injected into the flow of sorbent that is received by the second reactor system.

Preferably, in use, heat in any of the first reactor system, the vacuum pump and compressors (such as for $CO_2$ compression for transport and storage) is used to generate steam that is injected into the flow of sorbent that is received by the second reactor system.

Preferably, the gas capture system further comprises a cooler arranged in the sorbent flow path between the lock hopper in the first sorbent transfer system and the first reactor system; wherein the cooler is arranged to cool the sorbent that is recirculated by the first heat pump system.

Preferably, the gas capture system further comprises a second heat pump system arranged to recover latent heat from steam condensation in the gas output from the second reactor system.

Preferably, the second heat pump system is arranged to provide heat for generating steam for injecting into the flow of sorbent that is received by the second reactor system.

Preferably, the gas capture system further comprises a control system for reconfiguring the operation of the gas capture system; wherein: the control system is arranged to vary the heat transfer from the first reactor system to the second reactor system; and/or the control system is arranged to vary the pressure difference between the first reactor system to the second reactor system; and/or the control system is arranged to vary the temperature difference between the first reactor system to the second reactor system; and/or the control system is arranged to control the use of heat from the first pump system and/or the second heat pump system for the generation of steam for injection into the flow of sorbent that is received by the second reactor system.

LIST OF FIGURES

FIGS. 2A, 2B and 2C shows the operation of a lock hopper according to an embodiment;

DESCRIPTION

Figure 1:
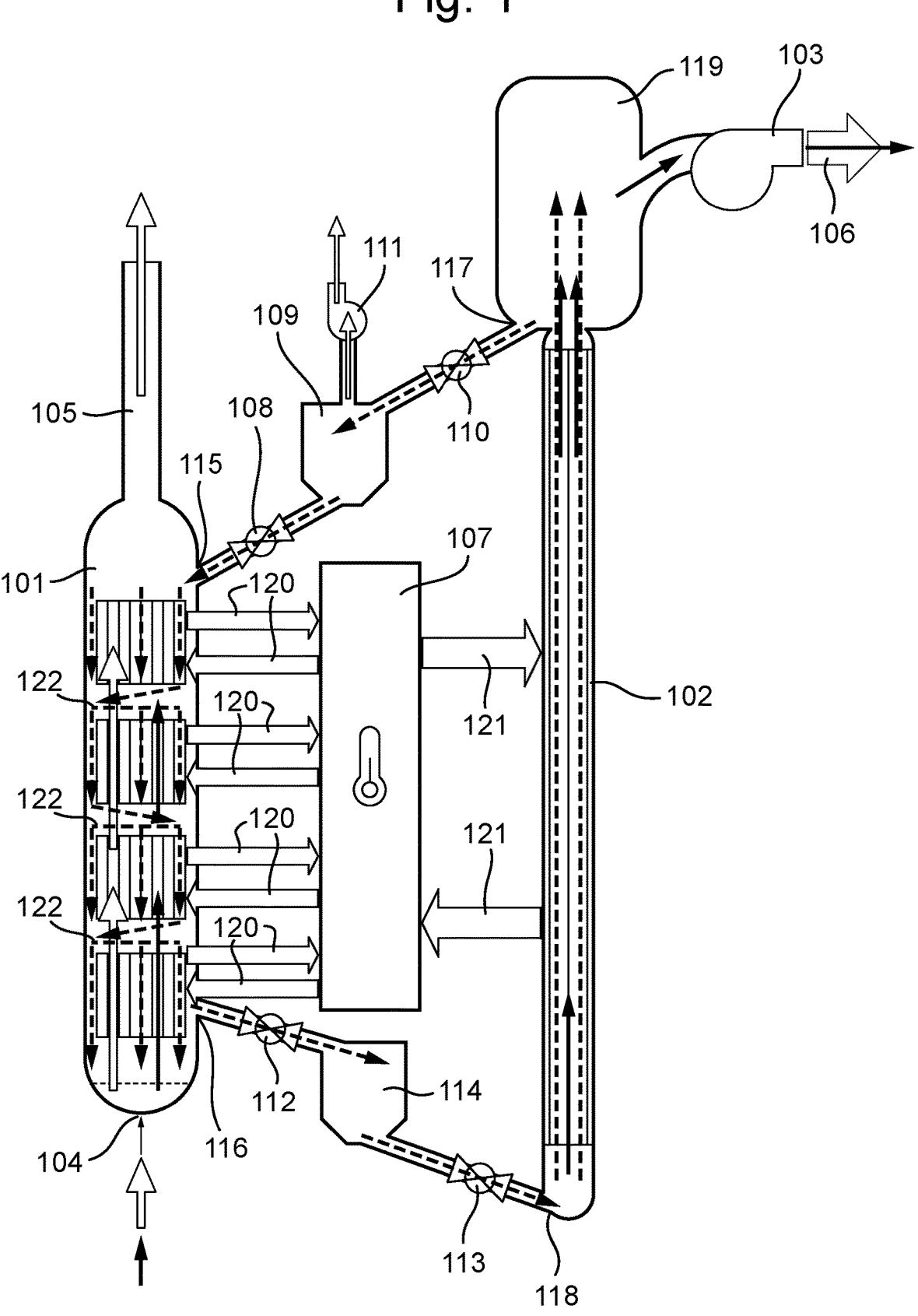
FIG. 1 shows a gas capture system according to a first embodiment.

Embodiments of the invention provide a new gas capture system that solves one or more problems with known gas capture systems.

Embodiments include techniques for carbon dioxide capture by a PCCC system. The PCCC system may be retrofitted to an existing fossil fuel-fired power plant, combustion engine, or any other source of gas. Alternatively, the PCCC system may be integrated into the design of a new fossil fuel-fired power plant, combustion engine, or any other source of gas.

According to particularly preferred embodiments, a new design of PCCC system is provided that uses a solid sorbent. The system comprises fluidised bed reactors as an absorber (which is a carbonator when $CO_2$ is captured) and a sorbent regenerator. The sorbent is circulated around the system between a gas capture process (which is a carbonation process when $CO_2$ is captured) in the absorber and a captured gas release process in the sorbent regenerator. The gas capture and regeneration processes within the system may be based on both a pressure swing and a temperature swing. That is to say, there may be a substantial pressure difference between the gas capture and regeneration processes of the sorbent. There may also be a substantial temperature difference between the gas capture and regeneration processes of the sorbent. The gas capture and regeneration processes within the system may alternatively, or additionally, be based on a partial pressure swing using steam and/or a temperature swing In an implementation of embodiments, a low temperature solid sorbent is used. However, implementations of embodiments also include the use of a medium temperature solid sorbent and/or a high temperature solid sorbent.

The recirculation of the sorbent around the system allows the gas capture system to be used substantially continuously.

The use of a pressure swing, and/or a partial pressure swing using steam, reduces the sorbent regeneration temperature. The use of a temperature swing in addition to a pressure swing allows the operating conditions to be adjusted so as to achieve a balance between the effectiveness of the gas capture process and the energy cost of operating the gas capture system. This can improve the overall efficiency of the gas capture system. The operation of the gas capture system can also be flexibly adjusted according to user requirements.

Embodiments are described in detail below with reference to a CCS system. However, it should be noted that embodiments include both the capture of other gases as well as other applications. For example, embodiments include the capture of gasses in addition, or as an alternative, to carbon dioxide, such as one or more of hydrogen sulphide, SOx (e.g. sulphur dioxide), hydrogen and NOx (e.g. nitrogen dioxide). More generally, embodiments include the capture of any type of substance for which the reaction between the substance and the sorbent is exothermic and the regeneration of the sorbent is endothermic.

Embodiments are also in no way limited to PCCC in fossil fuel-fired power plants or combustion engines. In particular, the cleaned gas can be generated by other processes than combustion (i.e. the cleaned gas does not need to be a flue gas). Embodiments include cleaning gasses in industries such as the power generation industry, metal production industry, cement production industry, fertilizer industry, petrochemical industry, biofuel production and mineral processing industry. In particular, embodiments can be used to clean gasses from cement production processes, blast furnace processes, steel production processes and reforming processes (e.g. for hydrogen production). For example, embodiments may include hydrogen sulphide capture from sour gas.

Figure 2A:
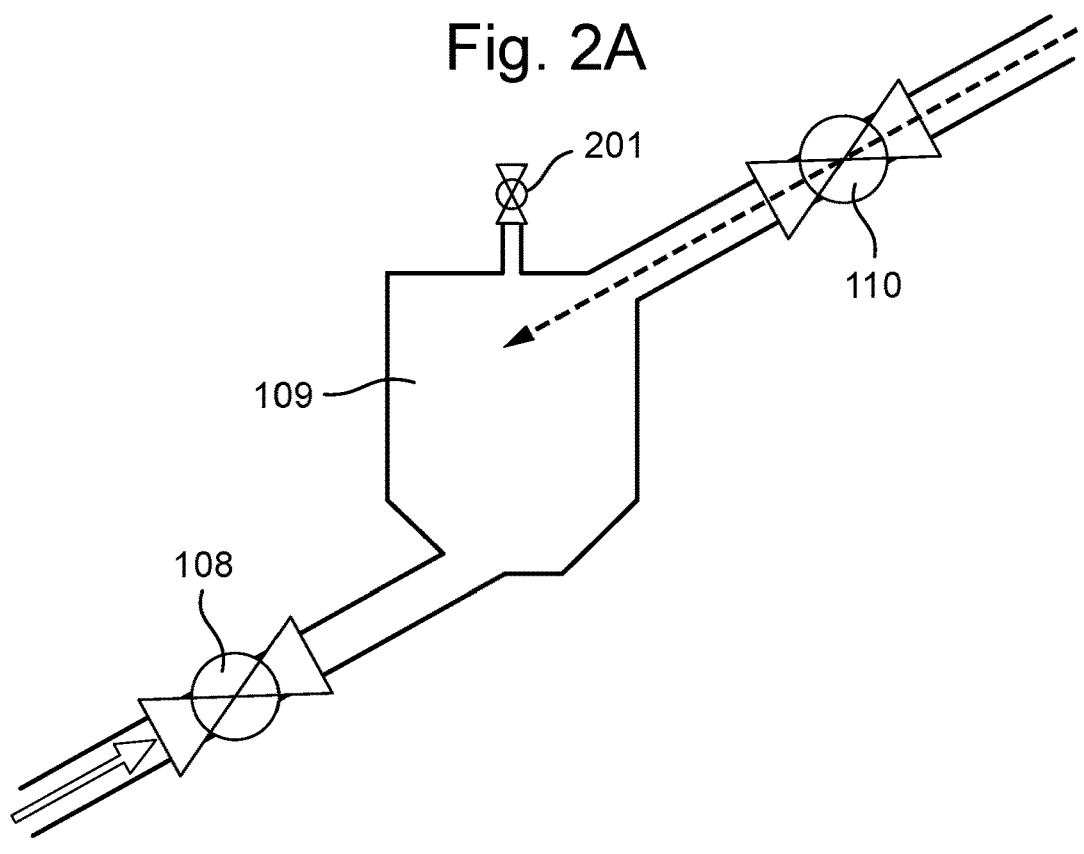
Figure 2B:
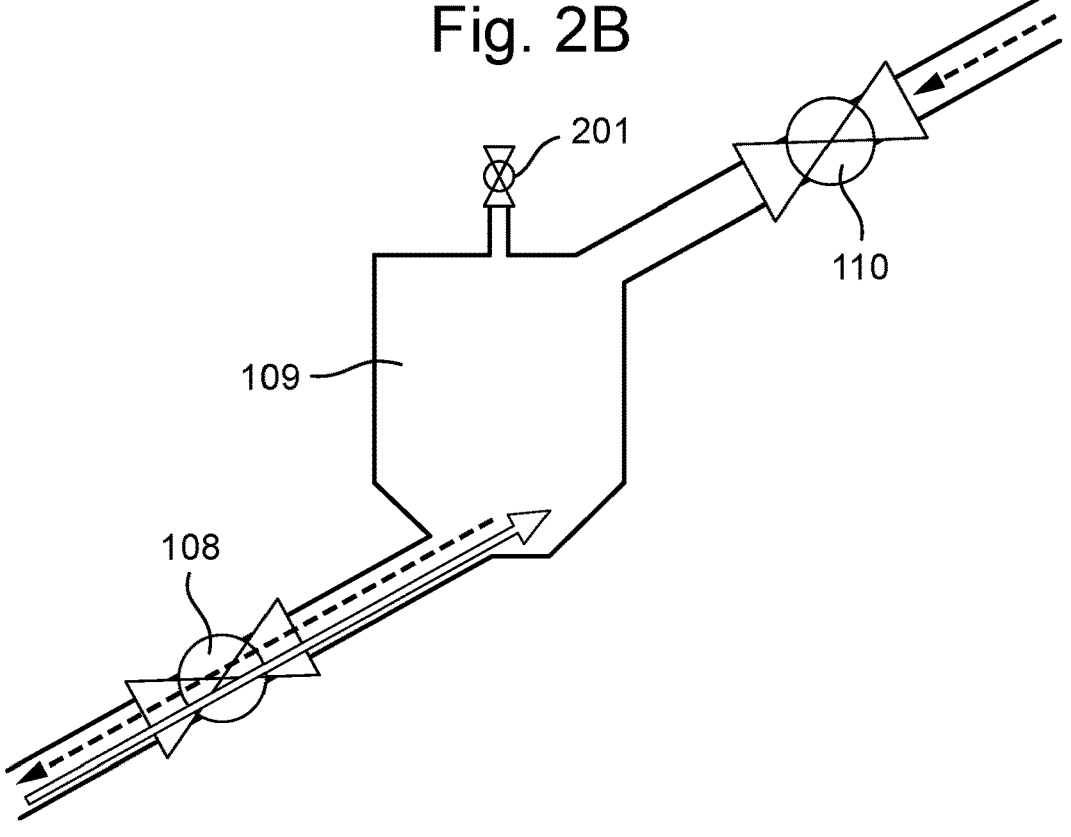
Figure 2C:
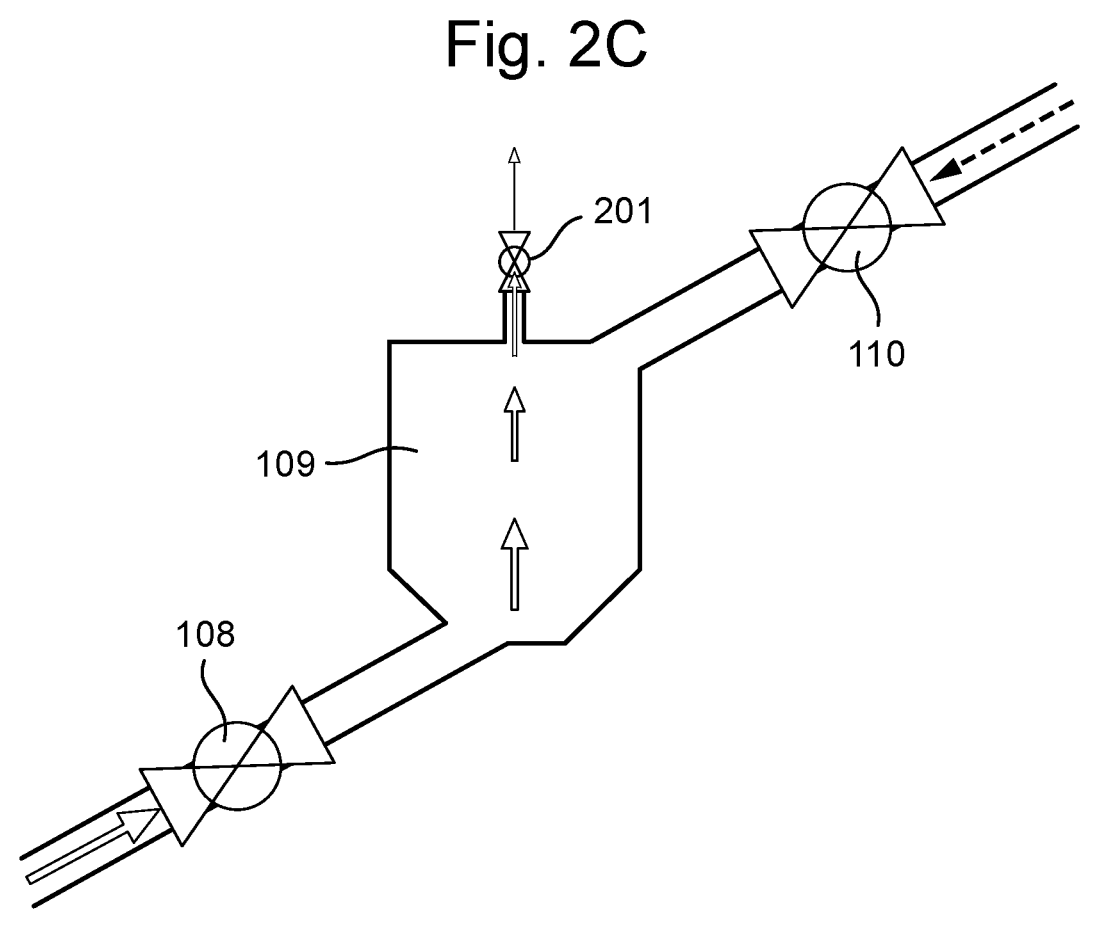

FIG. 1 shows a gas capture system according to an embodiment. FIGS. 2A, 2B and 2C show operational states of part of the gas capture system according to an embodiment.

The gas capture system comprises a first reactor system 101, a second reactor system 102, a first sorbent transfer system and a second sorbent transfer system. The first sorbent transfer system is arranged between a sorbent outlet 116 of the first reactor system 101 and a sorbent inlet 118 of the second reactor system. The second sorbent transfer system is arranged between a sorbent outlet 117 of the second reactor system 102 and a sorbent inlet 115 of the first reactor system 101.

The first reactor system 101 comprises a gas inlet 104 for receiving a gas stream, a gas outlet 105 for outputting the gas stream, a sorbent inlet 115 for receiving a flow of sorbent and a sorbent outlet 116 for outputting the flow of sorbent. The first reactor system 101 may be substantially elongate with a tubular housing. The gas inlet 104 and sorbent outlet 116 may be arranged at a first end of the first reactor system 101. The gas outlet 105 and sorbent inlet 115 may be arranged at a second end of the first reactor system 101. The second end may be at an opposite end of the first reactor system 101 to the first end. The first reactor system 101 may comprise at least one reaction region arranged within the housing and between the opposite ends of the first reactor system 101. In a preferred implementation, the longitudinal axis of the first reactor system is substantially vertical. The second end of the first reactor system, that comprises the gas outlet 105 and sorbent inlet 115, may be positioned vertically above the first end of the first reactor system, that comprises the gas inlet 104 and sorbent outlet 116.

The first reactor system 101 may comprise heating tubes, cooling tubes, baffle plates (for slowing/controlling the flow of sorbent) and any other components required to establish and maintain appropriate conditions in the first reactor system 101 for a reaction to occur between the sorbent and a gas in the gas stream. In particular, in the first reactor system 101 cooling tubes/pipes may extend through the reaction region and indirectly cool the sorbent and gas therein. The first reactor system 101 may also comprise components, such as fans and channels, for ensuring an appropriate flow of the sorbent and the gas stream through the first reactor system 101.

The first sorbent transfer system is arranged between a sorbent outlet 116 of the first reactor system 101 and a sorbent inlet 118 of the second reactor system 102. The first sorbent transfer system comprises one or more conduits for sorbent and a lock hopper. The lock hopper comprises an upstream valve 112, a chamber 114, and a downstream valve 113.

The first sorbent transfer system is arranged so that sorbent may travel from the first reactor system 101 to the second reactor system 102 without substantial gas transfer occurring between the first reactor system 101 and the second reactor system 102. There is therefore substantially no gas flow between the first reactor system 101 and the second reactor system 102, and vice-versa.

The second reactor system 102 comprises a sorbent inlet 118, a regeneration region and a sorbent outlet 117. The second reactor system 102 may be substantially elongate with a tubular housing. The sorbent inlet 118 and sorbent outlet 117 may be at opposite ends of the second reactor system 102. The regeneration region may be arranged within the housing and between the sorbent inlet 118 and sorbent outlet 117. The second reactor system 102 also comprises a gas outlet 106 arranged so that released gas from the sorbent may flow out of the regeneration region of the second reactor system 102. The gas outlet 106 may be at the same end of the second reactor system 102 as the sorbent outlet 117. The second reactor system 102 comprises a pump 103 for reducing the pressure in the regeneration region of the second reactor system 102. The pump 103 may be a vacuum pump and operable to reduce the pressure in the regeneration region of the second reactor system 102 to a substantial vacuum. The pump 103 also sucks gas released in the regeneration region out of the second reactor system 102.

The second reactor system 102 may comprise heat exchange surfaces such as heating tubes, cooling tubes and any other components required to establish and maintain appropriate conditions in the second reactor system 102 for regeneration of the sorbent to occur. In particular, heating tubes, such as heat pipes, may extend through the regeneration region of the second reactor system 102 and indirectly heat sorbent that is moving through the regeneration region.

The second reactor system 102 may also comprise components, such as fans, pumps and channels, for ensuring an appropriate flow of the sorbent and gas through the second reactor system 102.

In a preferred implementation of the second reactor system 102, the second reactor system 102 is arranged vertically with the sorbent outlet 117 arranged vertically above the sorbent inlet 118.

The second sorbent transfer system is arranged between a sorbent outlet 117 of the second reactor system 102 and a sorbent inlet 115 of the first reactor system 101. The second sorbent transfer system comprises one or more conduits for sorbent and a lock hopper. The lock hopper comprises an upstream valve 110, a chamber 109, a downstream valve 108 and a pump 111. The pump 111 is arranged to evacuate gas from the chamber 109. As shown in FIGS. 2A to 2C, a valve 201 may be arranged between the pump 111 and the chamber 109 to control the gas flow between the pump 111 and the chamber 109.

The second sorbent transfer system is arranged so that sorbent may travel from the second reactor system 102 to the first reactor system 101 without substantial gas transfer occurring between the second reactor system 102 and the first reactor system 101. There is therefore substantially no gas flow between the second reactor system 102 and the first reactor system 101, and vice-versa.

Under operation of the gas capture system, the first reactor system 101 receives a gas stream at the gas inlet 104. The gas stream may be a gas mixture that comprises a gas that may be captured by the sorbent. The gas stream flows from the gas inlet 104, through the reaction region and out through the gas outlet 105. The gas stream may flow substantially vertically upwards through the first reactor system 101.

The first reactor system 101 also receives a flow of sorbent at the sorbent inlet 115. The sorbent flows through the reaction region and out through the sorbent outlet 116. The sorbent may flow substantially vertically downwards through the first reactor system 101. The sorbent may be a sorbent of at least one of the gasses in the gas mixture. The sorbent may comprise solid particles.

The sorbent and gas stream may be in a substantial counter flow through the first reactor system 101. The sorbent contacts the gas stream in the reaction region and reacts to capture at least some of the gas in the gas stream. The sorbent may adsorb and/or absorb gas so that there is mass transfer between a gas in the gas stream and the sorbent. The gas stream at the gas outlet 105 may therefore comprise a lower concentration of the captured gas by the sorbent than the gas stream at the gas inlet 104.

The first reactor system 101 may be a counter current fluidised bed reactor. The gas may first flow substantially upwards through a fluidised bed of sorbent. The gas may then flow substantially upwards in the reaction region and contact a downward flow of particles of sorbent. Various components, such as baffles, may be provided inside the reaction region for controlling the residence time of the sorbent particles and improving the contact between the gas and the sorbent particles. The reaction region may also comprise heat transfer surfaces of a heat exchanger. The reaction in the reaction region is exothermic and the heat transfer surfaces cool the gas and sorbent. Preferably, the operating temperature within the reaction region of the first reactor system 101 is maintained at a substantially constant temperature.

In a particularly preferred implementation of the first reactor system 101, the first reactor system 101 comprises a plurality of reactors. The number of reactors comprised by the first reactor system 101 may be, for example, between 2 and 10. Each reactor may comprise a gas inlet for receiving the gas stream, a gas outlet for outputting the gas stream, a sorbent inlet for receiving the sorbent and a sorbent outlet for outputting the sorbent.

Each reactor may be one of the above-described counter current reaction regions. The counter current reaction regions may all be arranged in series with each other, or in a series/parallel configuration. A heat exchanger may be provided in each of the counter current reaction regions so that heat transfer surfaces in each reactor cool the gas and sorbent therein. As shown in FIG. 1, the first reactor system 101 may comprise a single fluidised bed at the gas inlet 104 and a series configuration of the above-described plurality of counter current reaction regions. A stage separation mesh 122 may be provided in the gas flow path between each of the counter current reaction regions. Each stage separation mesh 122 may be, for example, a perforated plate or a porous plate. Gas may flow through a stage separation mesh 122 without a substantial change in the direction of the gas flow path. The stage separation mesh 122 may be arranged so that sorbent output from a counter current reaction region is distributed substantially evenly across sorbent inlet(s) of a subsequent counter current reaction region.

Embodiments also include the first reactor system 101 comprising a plurality of the above-described counter current fluidised bed reactors, with each reactor comprising a fluidised bed. The plurality of counter current fluidised bed reactors may be arranged in a series and/or parallel configuration.

An advantage of the first reactor system 101 comprising a plurality of reactors is that it may be easier to maintain the desired reaction conditions in a plurality of small reactors than in a single large reactor.

The aspects of the design of the first reactor system 101 that support contact between a gas stream and particles of solid sorbent may be as disclosed in: 'Dietrich, F., G. Schöny, J. Fuchs and H. Hofbauer (2018). "Experimental study of the adsorber performance in a multi-stage fluidized bed system for continuous CO2 capture by means of temperature swing adsorption." Fuel Processing Technology 173: 103-111.' As described in more detail later, embodiments include using a heat pump system 107 to transfer heat from the first reactor system 101 to the second reactor system 102 and this is a substantial difference to the above publication by Dietrich et al. This difference may also result in different areas and shapes of heat transfer surfaces from Dietrich et al. being used.

The gas stream that flows out of the gas outlet 105 may be released directly into the atmosphere. Alternatively, further processes may be performed on the gas stream. For example, the gas stream may be supplied to another gas capture process for capturing another gas in the gas stream and/or for further reducing the concentration of the captured gas in the first reactor system. The gas stream may additionally, or alternatively, be passed through a heat exchanger for capturing some of its heat before it is released into the atmosphere.

The sorbent may flow out of the sorbent outlet 116 of the first reactor system 101 and into the first sorbent transfer system.

The flow of sorbent into the first sorbent transfer system may be arranged by closing the downstream valve 113 and then opening the upstream valve 112 of the lock hopper. Sorbent may then flow into the chamber 114 of the of the lock hopper. Sorbent may be allowed to flow into the chamber 114 until the chamber is full and comprises substantially no gas. The operating configuration of the lock hopper may then be changed so that the upstream valve 112 is closed and the downstream valve 113 is open. The sorbent in the chamber 114 can then flow out of the chamber 114 and to the sorbent inlet 118 of the second reactor system 102.

The operating configuration of the lock hopper may then be reverted back so that the downstream valve 113 is closed and the upstream valve 112 is open. The processes described above may then be repeated so that more sorbent may be transferred from the first reactor system 101 to the second reactor system 102. Although not shown in FIG. 1, the lock hopper in the first sorbent transfer system may have a pump connected to the chamber 114 via a valve (in a similar arrangement to that described later with reference to the lock hopper in the second sorbent transfer system and shown in FIGS. 2A, 2B and 2C). The pump may evacuate gas from the chamber 114 when the upstream valve 112 and downstream valve 113 are closed as a further measure to substantially prevent gas transfer between the first reactor system 101 and the second reactor system 102.

The sorbent flows through the sorbent inlet 118 and into the regeneration region of the second reactor system 102. The pump 103 may reduce the operational pressure in the regeneration region to an at least partial, and optionally substantial, vacuum. The sorbent may be heated in the sorbent regeneration region. The temperature and low pressure conditions in the regeneration region regenerate the sorbent so that the sorbent releases at least some of the gas that was captured by the sorbent in the first reactor system 101. The gas that is released by the sorbent may flow out of the second reactor system 102 through the gas outlet 106. The sorbent may flow through the sorbent outlet 117 and into the first sorbent transfer system.

The second reactor system 102 may be a riser. Solid sorbent particles may flow substantially upwards through the riser and contact heat transfer surfaces of a heat exchanger. The heat transfer surfaces may heat the sorbent so as to maintain a substantially constant reaction temperature even though the regeneration of the sorbent is an endothermic process. The second reactor system 102 may also be a fluidised reactor with fluidisation created by the gas released by the sorbent being regenerated. The sorbent particles may be transported upwards through the riser due to a combined drag force resulting from the gas released by the sorbent during regeneration and the suction from the pump 103. The second reactor system 102 may comprise an expanding freeboard region 119 between the regeneration region and the pump 103. The expanding freeboard region 119 comprises an expanding freeboard for separating the sorbent from the released gas in the regeneration region. In the expanding freeboard region 119, the sorbent may decelerate and fall down to the sorbent outlet 117, whereas the gas flows to the gas outlet 106.

FIGS. 2A, 2B and 2C show different operating configurations of the lock hopper of the second sorbent transfer system.

In the configuration shown in FIG. 2A, sorbent flows from the second reactor system 102 into the second sorbent transfer system. The flow of sorbent into the second sorbent transfer system may be arranged by opening the upstream valve 110 of the lock hopper when the downstream valve 108 is closed. The valve 201 between the chamber 109 and the pump 111 may also be closed so that no sorbent or gas may flow to the pump 111. Sorbent may then flow into the chamber 109 of the of the lock hopper. Sorbent may be allowed to flow into the chamber 109 until the chamber is full and comprises substantially no gas.

The operating configuration of the lock hopper may then be changed to the configuration shown in FIG. 2B. As shown in the FIG. 2B, the upstream valve 110 and valve 201 are closed and the downstream valve 108 is open. The sorbent in the chamber 109 can then flow out of the chamber 109 and to the sorbent inlet 115 of the first reactor system 101. When the downstream valve is open, gas may also flow from the first reactor system 101 into the chamber 109.

The operating configuration of the lock hopper may then be changed to the configuration shown in FIG. 2C. As shown in FIG. 2C, the upstream valve 110 and downstream valve 108 are closed and the valve 201 to the pump is open. The pump 111 may then be used to evacuate the gas from the chamber 109.

The lock hopper may then be changed back to the configuration shown in FIG. 2A, in which the upstream valve 110 is open, so that the processes described above with reference to FIGS. 2A to 2C may be repeated and more sorbent may be transferred from the second reactor system 102 to the first reactor system 101. The evacuation of the gas from the chamber 109 by the pump 111 may substantially prevent any of the gas in the first reactor system 101 flowing into the second reactor system 102. Such a gas flow may reduce the purity of the captured gas that flows out through the gas outlet 106.

Accordingly, embodiments provide a gas capture system with a gas inlet 104 for receiving a gas stream, a gas outlet 105 for outputting a cleaned gas stream and a separate gas outlet 106 for outputting captured gas from the received gas stream. Sorbent may be recirculated around the components of the gas capture system. When the sorbent is in the first reactor system 101, gas is captured by the sorbent and when the sorbent is in the second reactor system 102 the captured gas is released by the sorbent. The received gas stream by the gas capture system is therefore cleaned by the sorbent.

In embodiments, the solid sorbent used in the gas capture system may be a low temperature sorbent. The operational temperature in the first reactor system 101 when the sorbent is used to capture a gas in the gas stream may be in a range of about 40° C. to 90° C., and is preferably about 60° C.

The operational temperature in the second reactor system 102 when the sorbent is regenerated may be in a range of about 60° C. to 130° C., and is preferably about 80° C.

The regeneration of the sorbent in the second reactor system 102 may occur at a higher temperature than the gas capture by the sorbent in the first reactor system 101. The use and regeneration of the sorbent may therefore be performed by a temperature swing.

The operational pressure in the first reactor system 101 when the sorbent is used to capture a gas in the gas stream may be in a range of about 0.9 bar to 1.1 bar, and is preferably about 1 bar.

The operational pressure in the second reactor system 102 when the sorbent is regenerated may be in a range of about 0.001 bar to 0.8 bar, and is preferably a substantial vacuum.

The regeneration of the sorbent in the second reactor system 102 may occur at a lower pressure than the gas capture by the sorbent in the first reactor system 101. The use and regeneration of the sorbent may therefore be performed by a pressure swing.

Embodiments include the use and regeneration of the sorbent being performed by a combined temperature swing and pressure swing.

The gas capture system may comprise a controller for controlling the operating conditions of the first reactor system 101 and the second reactor system 102.

Embodiments include automatically adjusting the operating conditions of the first reactor system 101 and the second reactor system 102 so that the operating conditions are the most appropriate for the current application. In particular, the operating temperatures in the first reactor system 101 and the second reactor system 102, as well as the operating pressures in the first reactor system 101 and the second reactor system 102, may be adjusted to achieve a desired amount of gas capture at a low energy cost.

Depending on the application and user requirements, the most appropriate operating conditions for the gas capture system may be, for example, those that achieve the maximum amount of gas capture with the lowest energy requirement for the maximum amount of gas capture. The most appropriate operating conditions for the gas capture system may alternatively be those that achieve a desired amount of gas capture with a low energy requirement. The desired amount of gas capture may not be the maximum achievable amount of gas capture. The desired amount of gas capture may be determined in dependence on the financial cost, in CAPEX and/or OPEX, of the gas capture process.

The operating conditions for achieving the maximum, or desired, amount of gas capture may vary and depend on the content, temperature, pressure and/or other properties of the gas stream that is received by the gas capture system. The gas capture system according to embodiments may be automatically controlled so that the operating conditions are automatically adjusted as required for achieving the desired amount of gas capture and energy requirements. In particular, the operating temperatures in the first reactor system 101 and the second reactor system 102, as well as the operating pressures in the first reactor system 101 and the second reactor system 102, may be adjusted to achieve a desired amount of gas capture at the lowest energy cost. As described in more detail later, embodiments include using a heat pump system 107 to transfer heat from the first reactor system 101 to the second reactor system 102. Embodiments include selecting and operating the heat pump system 107 so as to improve the overall performance of the gas capture system. For example, the use of a heat pump system 107 may reduce the overall energy requirements, CAPEX and/or OPEX.

The gas capture reaction in the first reactor system 101 may be exothermic. The first reactor system 101 may comprise one or more cooling tubes/plates for maintaining a desired reaction temperature in the first reactor system 101. The cooling tubes/plates may extend through the reaction region of the first reactor system 101 and be in direct thermal contact with the gas stream and sorbent.

The sorbent regeneration reaction in the second reactor system 102 may be endothermic. The second reactor system 102 may comprise one or more heating tubes/plates for maintaining a desired reaction temperature in the second reactor system 102. The heating tubes/plates may extend through the regeneration region of the second reactor system 102 and be in direct thermal contact with the sorbent, and gas released by the sorbent.

The gas capture system may comprise substantially independent systems for providing cooling to the first reactor system 101 and heating to the second reactor system 102.

In a particularly preferred implementation of embodiments, the gas capture system comprises a heat pump system 107, as shown in FIG. 1. The heat pump system 107 is arranged to transfer some of the heat from the first reactor system 101 to the second reactor system 102.

The heat pump system 107 may comprise a first heat exchanger in the first reactor system 101 and heat pipes 120. The heat pipes 120 are arranged to transfer heat out of the first reactor system 101. Each of the heat pipes 120 may be solid heat pipes or comprise a circulating fluid. For example, some of the heat pipes 120 may supply cool fluid to the first heat exchanger and the other heat pipes 120 may receive heated fluid from the first heat exchanger.

As described above, the first reactor system 101 may comprise a plurality of reactors. The heat pump system 107 may comprise a heat exchanger in each of the plurality of reactors of the first reactor system 101. As shown in FIG. 1, a separate arrangement of heat pipes 120 may be provided for each of the plurality of heat exchangers.

The heat pump system 107 may comprise a second heat exchanger in the second reactor system 102 and heat pipes 121 for supplying heat to the second heat exchanger. Each of the heat pipes 121 may be solid heat pipes or comprise a circulating fluid. For example, some of the heat pipes 121 may supply hot fluid to the second heat exchanger and the other heat pipes 121 may receive cooled fluid from the second heat exchanger.

The heat pump system 107 may comprise a heat pump for controlling the transfer of heat from the first reactor system 101 to the second reactor system 102.

Fluid may be circulated, by the heat pump system 107, between each heat exchanger in the first reactor system 101 and each heat exchanger in the second reactor system 102. The heat pump may comprise a compressor for compressing, and optionally condensing, the fluid. For example, a liquid may be supplied to each heat exchanger in the first reactor system 101 and heated therein so that it evaporates. The compressor may compress the gas output from each heat exchanger in the first reactor system 101 and supply the compressed fluid to the heat exchangers in the second reactor system 102. The fluid is cooled, and optionally condensed, in the heat exchangers in the second reactor system 102.

The fluid output from the heat exchangers in the second reactor system 102 may then be supplied to the heat exchangers in the first reactor system 101. The heat transfer may therefore occur through phase change. The system compresses to condense the vapour in the regeneration and decompresses to evaporate the working fluid in the carbonation.

Alternatively, there may be a first recirculated flow of fluid between the heat pump system 107 and the heat exchangers in the first reactor system 101 and a second recirculated flow of fluid between the heat pump system 107 and the heat exchangers in the second reactor system 102. Heat may be transferred between the separate flows of fluid by a heat exchanger in the heat pump system 107.

When the operational temperatures throughout the gas capture system are in the range of about 40° C. to 80° C., a commercially available ammonia heat pump may be used for transferring heat from the first reactor system 101 to the second reactor system 102. For industrial applications operating at higher temperatures, other types of heat pumps, such as steam, CO2, ethane or butane based heat pumps, may be used.

The provision of a pressure swing between the first reactor system 101 and the second reactor system 102 reduces the temperature difference between the temperature required for gas capture by the sorbent and the temperature required for regeneration of the sorbent. This improves the efficiency of the heat pump system 107. The heat pump system 107 supplies heat generated in the exothermic gas capture process to the endothermic sorbent regeneration process. The heat pump system 107 may provide an energy saving that reduces the overall energy cost of operating the gas capture system.

The sorbent is a solid. The sorbent may be in the form of particles. The sorbent may be polyethylenimine. However, embodiments more generally include the use of a number of suitable types of sorbents. Preferably a sorbent with a high sensitivity to a temperature swing is used because this may allow the most efficient operation of the heat pump system 107. The sorbent may comprise one or more of polyethylenimine, a metal organic framework based sorbent, zeolite, activated carbon, 3D graphene, any substance for chemi-, phys-sorption and/or hydrids of these.

The particle size of the sorbent may be in the range 100 μm to 1000 μm.

The sorbent may be any of the sorbents disclosed in: 'Cloete, S., et al., Economic assessment of the swing adsorption reactor cluster for CO2 capture from cement production. Journal of Cleaner Production, 2020. 275: p. 123024'.

When the sorbent is polyethylenimine, or a metal organic framework based sorbent, the preferred gas capture conditions may comprise a temperature in the range 40° C. to 90° C. and operation at atmospheric pressure. The sorbent regeneration conditions may comprise a temperature in the range 60° C. to 130° C. and operation in a substantial vacuum.

For other sorbent species, that may have a small concentration, the operational pressure in the first reactor system 101 may be increased to above 20 bar and the sorbent regeneration performed at atmospheric pressure.

The gas capture system according to embodiments may be operated by an electrical power supply only. The electrical power may be required for establishing a vacuum, or partial vacuum, in the second reactor system 102. The electrical power may also be required for operating a compressor in the heat pump system 107, as well as operating fans, pumps and any other components that the gas capture system may comprise. The gas capture system may therefore be particularly suited to retrofitting to an existing source of a gas stream, such as a flue gas, because it does not require heat integration with the source of the gas stream.

One application of the gas capture system of embodiment is as a PCCC system that has been retrofitted to a source of flue gas, such as a fossil fuel-fired power plant or combustion engine.

The received gas stream at the gas inlet 104 may be a carbonaceous gas, such as a flue gas that comprises carbon dioxide. The sorbent may be a sorbent of carbon dioxide. In the first reactor system 101 at least some of the carbon dioxide in the flue gas may be captured by the sorbent. The first reactor system 101 may therefore be a carbonator. The second reactor system 102 may be a sorbent regenerator. The gas output from the gas outlet 106 of the second reactor system 102 may be substantially pure carbon dioxide. The carbon dioxide may be stored or used in industrial processes, according to known techniques. For example, the carbon dioxide may be input into a compression and liquefaction plant so that the carbon dioxide is not released into the atmosphere.

The above-described techniques are techniques of a first embodiment.

A second embodiment is described below with reference to FIG. 3. The second embodiment may comprise a number of the earlier described components of the first embodiment. In particular, the first reactor system 101 and second reactor system 102 of the second embodiment may be the same as, or similar to, the first reactor system 101 and second reactor system 102 of the first embodiment. In the second embodiment, the first reactor system 101 may also receive a gas mixture, at a gas inlet 104, and capture a gas within the gas mixture. The gas mixture may be a flue gas and the captured gas may be carbon dioxide.

The gas capture system of the second embodiment comprises a first reactor system 101, a second reactor system 102, a first sorbent transfer system and a second sorbent transfer system. The first sorbent transfer system is arranged between a sorbent outlet of the first reactor system 101 and a sorbent inlet of the second reactor system. The second sorbent transfer system is arranged between a sorbent outlet of the second reactor system 102 and a sorbent inlet of the first reactor system 101.

The first reactor system 101 comprises a gas inlet 104 for receiving a gas stream, a gas outlet 105 for outputting the gas stream, a sorbent inlet for receiving a flow of sorbent and a sorbent outlet for outputting the flow of sorbent. The first reactor system 101 may be substantially elongate with a tubular housing. The gas inlet 104 and sorbent outlet may be arranged at a first end of the first reactor system 101. The gas outlet 105 and sorbent inlet may be arranged at a second end of the first reactor system 101. The second end may be at an opposite end of the first reactor system 101 to the first end. The first reactor system 101 may comprise at least one reaction region arranged within the housing and between the opposite ends of the first reactor system 101. In a preferred implementation, the longitudinal axis of the first reactor system is substantially vertical. The second end of the first reactor system, that comprises the gas outlet 105 and sorbent inlet, may be positioned vertically above the first end of the first reactor system, that comprises the gas inlet 104 and sorbent outlet.

The first reactor system 101 may comprise heating tubes, cooling tubes, baffle plates (for slowing/controlling the flow of sorbent) and any other components required to establish and maintain appropriate conditions in the first reactor system 101 for a reaction to occur between the sorbent and a gas in the gas stream. In particular, in the first reactor system 101 cooling tubes/pipes may extend through the reaction region and indirectly cool the sorbent and gas therein. The first reactor system 101 may also comprise components, such as fans and channels, for ensuring an appropriate flow of the sorbent and the gas stream through the first reactor system 101.

The first reactor system 101 may comprise a fluid inlet 314 and fluid outlet 315 as well as a fluid conduit arranged between the fluid inlet 314 and fluid outlet 315. The fluid conduit may be provided in at least one reaction region of the first reactor system 101. When the system is operated, fluid that flows through the fluid conduit may be heated. For example, water may flow through the fluid inlet 314 and into the fluid conduit. The water may be heated in the fluid conduit so that steam flows out of the fluid outlet 315.

The first sorbent transfer system is arranged between a sorbent outlet of the first reactor system 101 and a sorbent inlet of the second reactor system 102. The first sorbent transfer system comprises one or more conduits for sorbent and a lock hopper 302. The first sorbent transfer system may also comprise a steam inlet 313.

The lock hopper 302 comprises an upstream valve, a chamber, and a downstream valve. The lock hopper 302 may be substantially the same as the lock hopper in the first sorbent transfer system according to the first embodiment. The lock hopper outputs sorbent to a sorbent conduit 304.

The steam inlet 313 may be arranged in the sorbent conduit 304, i.e. between the downstream valve of the lock hopper and the sorbent inlet of the second reactor system 102. The steam inlet may receive a flow of steam that flows with the sorbent into the second reactor system 102. The flow of steam received at the steam inlet 313 may be steam from the fluid outlet 315. That is to say, steam that has been generated from heat in the first reactor system may be used as the supply of steam at the steam inlet 313.

During operation of the gas capture system, low pressure and low temperature steam may be supplied to the steam inlet 313. The steam may have been generated from heat in the first reactor system 101. The steam mixes with the flow of sorbent into the second reactor system 102. The effect of the steam is to reduce the partial pressure of the gas, that may be carbon dioxide, released by the sorbent in the second reactor system 102.

Advantageously, this may increase the release of gas from the sorbent and thereby increase the amount and/or efficiency of gas capture. Another advantage is that the use of steam may reduce the level of vacuum required in the second reactor system 102. Although the second reactor system 102 would typically be operated at a different pressure than the first reactor system 101, embodiments include the second reactor system 102 being operated so that the first reactor system 101 and the second reactor system 102 are operated at the same pressure, and/or the second reactor system 102 being operated substantially at atmospheric pressure. Another advantage is that the steam may be adsorbed on the sorbent. This may release reaction heat and partially compensate for the heating requirement due to the endothermic reaction in the second reactor system 102. The adsorbed steam is released from the sorbent in the first reactor system 101. This may remove reaction heat and partially compensate for the cooling requirement due to the exothermic reaction in the first reactor system 101. This helps to maintain a constant temperature in the first reactor system 101 and thereby maximise the capture of a gas, such as carbon dioxide, by the sorbent.

The first sorbent transfer system is arranged so that sorbent may travel from the first reactor system 101 to the second reactor system 102 without substantial gas transfer occurring between the first reactor system 101 and the second reactor system 102. There is therefore substantially no flow of the gas mixture received at the gas inlet 104 to the second reactor system 102.

The second reactor system 102 comprises a sorbent inlet, a regeneration region and a sorbent outlet. The second reactor system 102 may be substantially elongate with a tubular housing. The sorbent inlet and sorbent outlet may be at opposite ends of the second reactor system 102. The regeneration region may be arranged within the housing and between the sorbent inlet and sorbent outlet. The second reactor system 102 also comprises a gas outlet 106 arranged so that released gas from the sorbent may flow out of the regeneration region of the second reactor system 102. The gas outlet 106 may be at the same end of the second reactor system 102 as the sorbent outlet. The second reactor system 102 comprises a pump 103 for reducing the pressure in the regeneration region of the second reactor system 102. The pump 103 may be a vacuum pump and operable to reduce the pressure in the regeneration region of the second reactor system 102 to a substantial vacuum. The pump 103 also sucks gas released in the regeneration region out of the second reactor system 102.

The second reactor system 102 may comprise heating tubes, cooling tubes and any other components required to establish and maintain appropriate conditions in the second reactor system 102 for regeneration of the sorbent to occur. In particular, heating tubes, such as heat pipes, may extend through the regeneration region of the second reactor system 102 and indirectly heat sorbent that is moving through the regeneration region.

The second reactor system 102 may also comprise components, such as fans, pumps and channels, for ensuring an appropriate flow of the sorbent and gas through the second reactor system 102.

In a preferred implementation of the second reactor system 102, the second reactor system 102 is arranged vertically with the sorbent outlet arranged vertically above the sorbent inlet.

The second sorbent transfer system is arranged between a sorbent outlet of the second reactor system 102 and a sorbent inlet of the first reactor system 101. The second sorbent transfer system comprises one or more conduits for sorbent, a lock hopper 301 and a cooler 303.

The lock hopper 301 may be substantially the same as the lock hopper of the second sorbent transfer system of the first embodiment.

The cooler 303 may be arranged to cool the sorbent that flows from the lock hopper 301 to the first reactor system 101. The sorbent may be cooled by the flow of working fluid through the cooler 303.

The cooler 303 is arranged to receive working fluid from a cooler input conduit 305 and output the working fluid to cooler output conduit 306. The cooler 303 may also receive a flow of sorbent from the lock hopper 301 and output the flow of sorbent to the first reactor system 101. The cooler 303 may also receive air from an air input conduit 307 and output the air to an air output conduit 308. Within the cooler 303, the flow of sorbent may be cooled by the working fluid, and this process may heat the working fluid. Advantageously, the sorbent that flows out of the cooler 303 may therefore be at a closer temperature to the reaction conditions in the first reactor system 101. The flow of air through the cooler 303 through the conduits 307, 308 is optional. The flow of air through the cooler 303 generates some fluidisation of the sorbent in the cooler 303 and this increases the heat transfer between the sorbent and the working fluid.

The second sorbent transfer system is arranged so that sorbent may travel from the second reactor system 102 to the first reactor system 101 without substantial gas transfer occurring between the second reactor system 102 and the first reactor system 101. There is therefore substantially no gas flow from within the second reactor system 102 to within the first reactor system 101.

Figure 3:
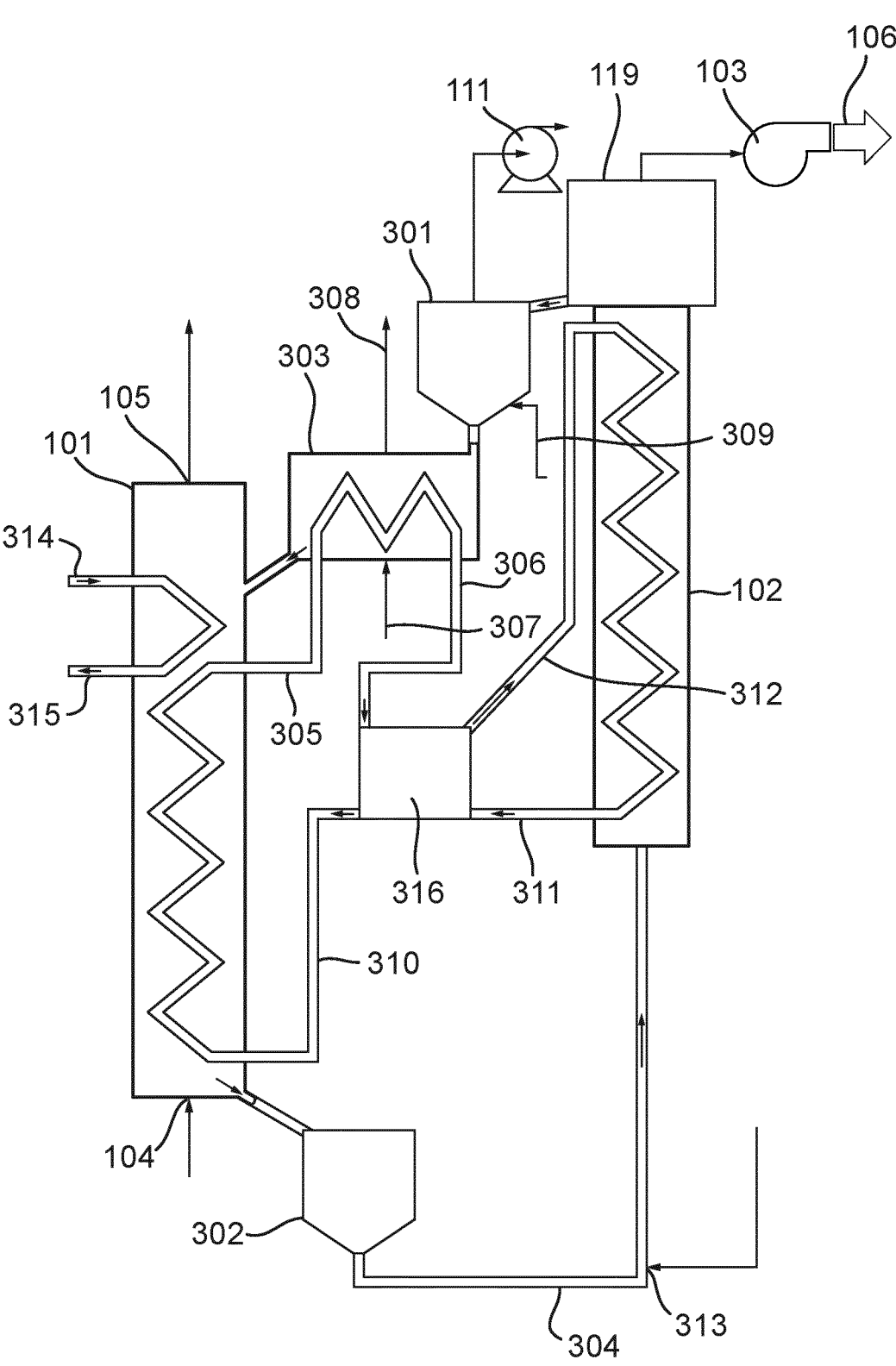
FIG. 3 shows a gas capture system according to a second embodiment.

The gas capture system of the second embodiment may comprise a heat pump system, as shown in FIG. 3. The heat pump system is arranged to transfer some of the heat from the first reactor system 101 to the second reactor system 102.

The heat pump system may comprise a heat pump 316. The heat pump 316 may comprise a first side and a second side. The heat pump 316 may comprise an expansion valve so that, when the working fluid flows through the first side of the heat pump 316, it may be expanded within the heat pump. The heat pump 316 may also comprise a compressor so that, when the working fluid flows through the second side of the heat pump 316, it may be compressed within the heat pump.

The working fluid may flow in a loop. The working fluid may flow out of the first side of the heat pump 316, then through a first heat pump output conduit 310, then through the first reactor system 101, then through the cooler input conduit 305, then through the cooler 303, then through the cooler output conduit 306, then through the second side of the heat pump 316 (where it is compressed), then through a second heat pump output conduit 312, then through the second reactor system 102, then through a heat pump input conduit 311, and then back to the first side of the heat pump 316 (where it is expanded).

As described of the first embodiment, the first reactor system 101 may comprise a first heat exchanger for heat transfer to the working fluid in the first reactor system 101. If the first reactor system 101 comprises a plurality of reactors, there may be a heat exchanger in each of the plurality of reactors of the first reactor system 101. The second reactor system 102 may also comprise a heat exchanger 102 for heat exchange to the working fluid in the second reactor system 102.

During operation of the gas capture system, the state of the working fluid when output from the first side of the heat pump 316 to the heat pump output conduit 310 may be a cool liquid. Within the first reactor system 101 the working fluid may be heated so that it becomes a gas. The state of the working fluid when output from the first reactor system 101 to the cooler input conduit 305 may be a hot gas. Within the cooler 303 the working fluid may be heated by the hot sorbent coming from the second reactor. The working fluid may then flow through the heat pump compressor where it is compressed. Within the second side of the heat pump 316, the compression of the working fluid may heat the working fluid so that the working fluid changes from being a cool gas to a hot gas. The state of the working fluid when input to the second reactor system 102 may therefore be a hot gas. Within the second reactor system 102 the working fluid may be cooled so that it becomes a hot liquid. Within the first side of the heat pump 316, the working fluid may be cooled, by an expansion process, from a hot liquid to a cool liquid.

The working fluid may be any suitable working fluid.

Alternatively, there may be a first recirculated flow of a first working fluid between the heat pump 314 and the heat exchangers in the first reactor system 101 and a second recirculated flow of second working fluid between the heat pump 314 and the heat exchangers in the second reactor system 102. Heat may be transferred between the separate flows of first and second working fluid by a heat exchanger in the heat pump 316.

Advantageously, the working fluid circulated by the heat pump system evaporates in the first reactor system 101 and condenses in the second reactor system 102. Such phase change heat transfers may be highly efficient and thereby may maximise heat recovery. The phase changes may also occur at a constant temperature and this helps to maintain substantially constant reaction conditions in the first reactor system 101 and the second reactor system 102. Phase change heat transfers may be performed with heat exchangers that have a small surface area and this both aids the implementation of the heat exchangers and reduces costs.

Figure 4:
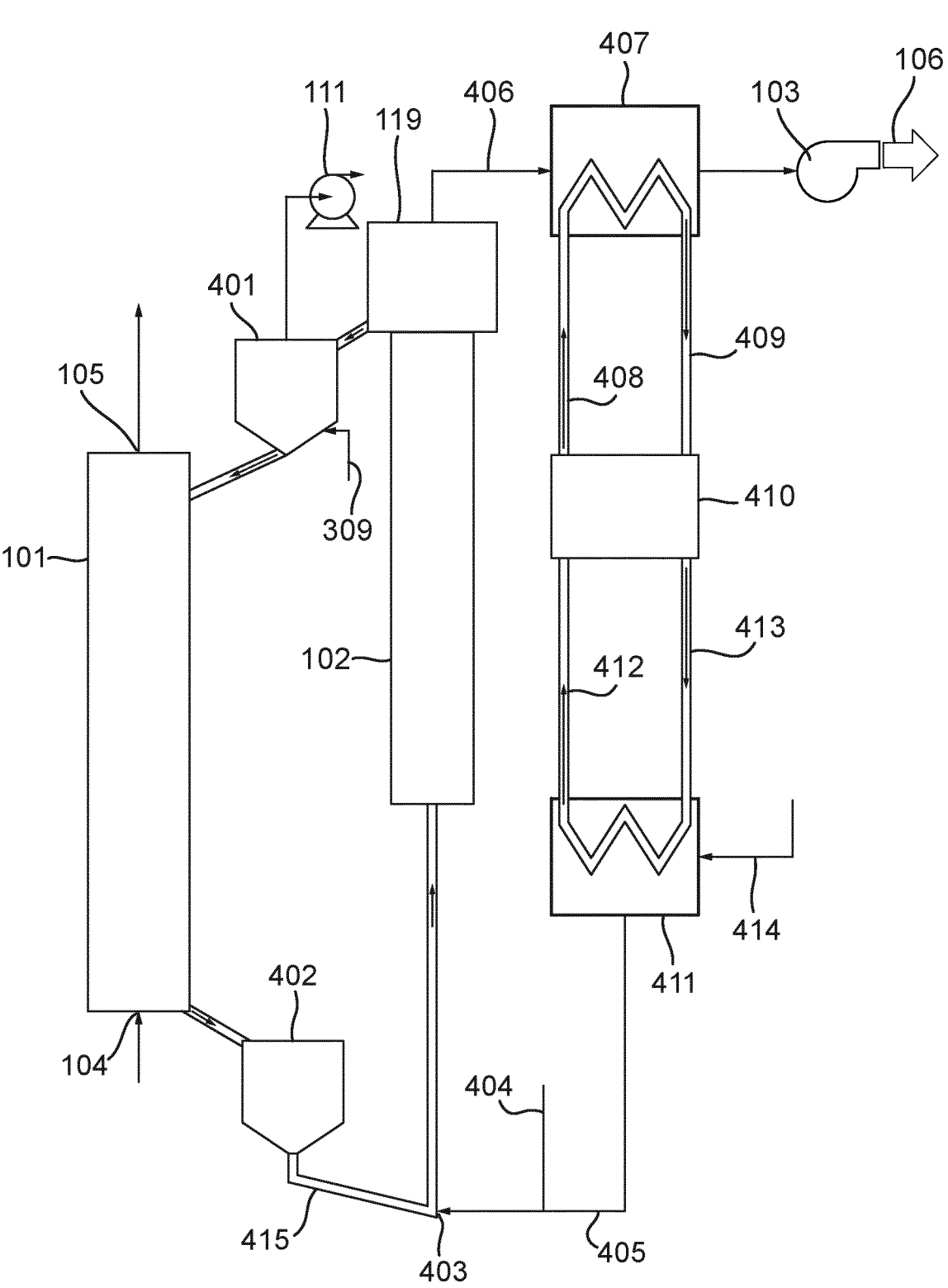
FIG. 4 shows a gas capture system according to a third embodiment.

FIG. 4 shows a gas capture system according to a third embodiment.

The gas capture system of the third embodiment comprises components that may be the same as, or similar, to the earlier described components of the first and second embodiments. In the third embodiment, the first reactor system 101 may also receive a gas mixture, at a gas inlet 104, and capture a gas within the gas mixture. The gas mixture may be a flue gas and the captured gas may be carbon dioxide.

In the third embodiment, sorbent is circulated between a first reactor system 101 and a second reactor system 102. There is a first sorbent transfer system that is arranged between a sorbent outlet of the first reactor system 101 and a sorbent inlet of the second reactor system 102. There is a second sorbent transfer system that is arranged between a sorbent outlet of the second reactor system 102 and a sorbent inlet of the first reactor system 101.

A difference between the gas capture system of the third embodiment and that of the second embodiment is the implementation of the heat exchanger system. In the third embodiment, there may be no operating heat exchanger system for transferring heat from the first reactor system 101 to the second reactor system 102.

In the third embodiment, there may also be no equivalent component to the cooler 303 in the second sorbent transfer system. The temperature difference between the reaction conditions in the first reactor system 101 and the second reactor system 102 may be small and so no sorbent cooling may be necessary.

Although not shown in FIG. 4, during operation there may be a heat supply to the sorbent regeneration reaction performed in the second reactor system 102. The heat supply may be excess heat from the process that generates the gas mixture that is input to the first reactor system 101. There may still be a heat exchanger system for removing heat from the first reactor system 101, substantially as described for the second embodiment. However, the heat exchanger system may differ from that as described for the second embodiment by releasing heat to the atmosphere instead of supplying the heat to the second reactor system 102. The heat may additionally, or alternatively, be used to raise low pressure steam for feeding to the second reactor system 102. Advantageously, this avoids the requirement of a heat pump compressor. The second reactor system 102 may operate at atmospheric pressure.

In the third embodiment, the second sorbent transfer system comprises a lock hopper 401 arranged to receive sorbent from the second reactor system 102. The lock hopper 401 may be the same as the lock hopper 301 in the second sorbent transfer system as described earlier for the second embodiment, or the lock hopper in the second sorbent transfer system as described earlier for the first embodiment. The lock hopper 401 may output sorbent to the first reactor system 101.

In the third embodiment, the first sorbent transfer system comprises a lock hopper 402 arranged to receive sorbent from the first reactor system 101. The lock hopper 402 may be the same as the lock hopper 302 in the first sorbent transfer system as described earlier for the second embodiment, or the lock hopper in the first sorbent transfer system as described earlier for the first embodiment. The lock hopper 402 may output sorbent to a sorbent conduit 415 so that the sorbent may flow into the second reactor system 102.

The sorbent conduit 415 may comprise a steam inlet 403 for receiving a flow of steam. As described for the second embodiment, there are a number of advantages arising from mixing steam into the flow of sorbent. These may include increased gas capture and improved operating efficiencies. The vacuum requirement may also be reduced. More specifically, mixing steam into the flow of saturated sorbent reduces the carbon dioxide partial pressure and initiates carbon dioxide desorption. The addition of steam also reduces the need for an extreme vacuum and this improves efficiency.

There is a second reactor system output conduit 406 that comprises a mixture of steam and the released gas, that is typically carbon dioxide, that flows out of the second reactor system 102.

In the third embodiment, there may be a heat exchanger system for recovering heat from the mixture of steam and captured gas in the second reactor system output conduit 406. The steam may be condensed to recover the latent heat. Given that the pressure is low, the condensation may occur at a low temperature, such as 50° C. to 70° C.

The heat exchanger system may comprise a first heat exchanger 407, a heat pump 410 and a second heat exchanger 411.

The heat pump 410 may comprise a first side and a second side. The heat pump 410 may comprise an expansion valve so that, when the working fluid flows through the first side of the heat pump 410, it may be expanded within the heat pump. The heat pump 410 may also comprise a compressor so that, when the working fluid flows through the second side of the heat pump 410, it may be compressed within the heat pump.

A working fluid may be circulated between the first heat exchanger 407, the heat pump 410 and the second heat exchanger 411. In particular, the working fluid may flow out of the first side of the heat pump 410 into an input conduit 408 of the first heat exchanger 407. The working fluid may then flow through the first heat exchanger 407. The working fluid may then flow out of the first heat exchanger 407 into an output conduit 409 of the first heat exchanger 407. The working fluid may then flow through the second side of the heat pump 410 (where it is compressed) and into an input conduit 413 of the second heat exchanger 411. The working fluid may then flow through the second heat exchanger 411. The working fluid may then flow out of the second heat exchanger 411 into an output conduit 412 of the second heat exchanger 411. The working fluid may then flow back to the first side of the heat pump 410 (where it is expanded).

The state of the working fluid flowing into the first heat exchanger 407 may be a cool liquid. The state of the working fluid flowing out of the first heat exchanger 407 may be a cool gas. The state of the working fluid flowing into the second side of the heat pump 410 may be a cool gas. The state of the working fluid flowing out of the second side of the heat pump 410 may be a hot gas. The state of the working fluid flowing into the second heat exchanger 411 may be a hot gas. The state of the working fluid flowing out of the second heat exchanger 411 may be a hot liquid. The state of the working fluid flowing into the first side of the heat pump 410 may be a hot liquid.

Accordingly, the working fluid may undergo phase changes in each of the heat exchangers 407, 411. As described for the second embodiment, this may reduce the size and improve the efficiency of the heat exchangers 407, 411. The phase changes may also occur at constant temperatures and this may help to maintain reaction conditions.

In the first heat exchanger 407, the steam in the gas mixture that is output from the second reactor system 102, i.e. the steam flowing through the second reactor system output conduit 406, may be condensed. This process recovers a substantial amount of latent heat that is transferred, by the heat pump 410, to the second heat exchanger 411 for raising steam. Advantageously, the output gas from the first heat exchanger 407 to the pump 103 and gas outlet 106 may have a high concentration of the captured gas, that may be carbon dioxide.

The second heat exchanger 411 may comprise an inlet for receiving a supply of water from a water supply conduit 414. The water in the water supply conduit 414 may be a supply of water that has condensed in the first heat exchanger 407 and/or a water supply from another source. In the second heat exchanger the received water from the water supply conduit 414 may be used to cool the working fluid. In this process the water may be heated to generate steam. The second heat exchanger may comprise a steam outlet conduit 405 for providing steam to the steam inlet 403 of the sorbent conduit 415.

There may also be a steam supply conduit 404 that is an additional source of steam to the steam inlet 403 of the sorbent conduit 415. The steam in the steam supply conduit 404 may be generated from any available heat source. For example, the steam may be generated from heat in the first reactor system 101 as described of the second embodiment. The steam may additionally, or alternatively, be generated from excess heat in the system that generates the gas mixture, for example flue gas, that is received by the first reactor system 101.

According to a fourth embodiment, there is provided a gas capture system that comprises both a heat exchanger implementation according to the second embodiment and also a heat exchanger implementation according to the third embodiment. The operation of the different heat exchanger systems may be reconfigured for substantially maximising operational efficiencies, such as increasing gas capture and/or reducing the energy required to operate the gas capture system.

In particular, the gas capture system may be used to capture gas, such as carbon dioxide, from a combined heat and power (CHP) plant. The gas capture system may use excess energy from the CHP plant, that would otherwise be wasted, to power aspects of its operation.

The gas capture system may be operated according to a first operating extreme that is the technique described for the second embodiment. This may be appropriate during periods of high energy demand of the CHP plant, such as during the winter months.

The gas capture system may also be reconfigured so that it is operated according to a second operating extreme that is the technique described for the third embodiment. This may be appropriate during periods of low energy demand of the CHP plant, such as during the summer months. As described for the second embodiment, when operating at the second operating extreme, the heat supply to the sorbent regeneration reaction performed in the second reactor system 102 may be excess heat from the CHP plant. A heat exchanger system may remove heat from the first reactor system and then release the heat to the atmosphere, instead of supplying the heat to the second reactor system 102. When operating at the second operating extreme, the second reactor system 102 may operate substantially at atmospheric pressure.

The system of the fourth embodiment may also be reconfigured, by a control system, so that it operates between the first and second operating extremes. For example, some, but not all, of the energy that can be transferred from the first reactor system 101 to the second reactor system may be provided to the second reactor system 102. The difference in operating pressures between the first reactor system 101 and the second reactor system 102 may also be varied. Under some of the operating conditions, there may be no difference in operating pressure between the first reactor system 101 and the second reactor system 102. The operating conditions may be dependent on the operation of the CHP plant and, in particular, the amount of waste energy received by the gas capture system from the CHP plant. The operating conditions may also be dependent on the output power of the CHP plant, which is typically varied to match the power demand.

Embodiments include a number of modifications and variations to the above-described techniques.

Embodiments have been mainly described with a low temperature solid sorbent being used. However, implementations of embodiments also include the use of a medium temperature solid sorbent and/or a high temperature solid sorbent. When a medium temperature solid sorbent and/or a high temperature solid sorbent are used, a heat pump system that is efficient at the higher operational temperatures should be used. In particular, steam, ethane and/or butane based heat pumps may be more appropriate at the higher operational temperatures.

The sorbent changes between a used form and a regenerated form as it is recirculated, in a sorbent cycle, through the components of the gas capture system. The term sorbent as used herein refers generally to particles of the sorbent at any point in the sorbent cycle and may refer to the sorbent when it is in either its used form or regenerated form. In addition, the sorbent at any point in the sorbent cycle may always be a mixture of particles of the sorbent in the used form and in the regenerated form. The gas capture process in the first reactor system 101 and sorbent regeneration process in the second reactor system 102 may change the proportions of the used and regenerated forms of the sorbent throughout the sorbent cycle.

Embodiments include the use of a mixture of different sorbents so that more than one gas is captured by the gas capture system. For example, different solid sorbent particles for carbon dioxide and hydrogen sulphide could be mixed and then used together. The gas capture system would then be capable of capturing both carbon dioxide and hydrogen sulphide from a gas stream.

In a preferred application of embodiments, the gas being cleaned is a flue gas from a combustion process. However, embodiments may be used to capture a gas from any gas mixture and are not restricted to being used for cleaning a flue gas. The gas to be cleaned may be referred to as a dirty gas. The dirty gas may be, for example, sour gas directly output from a well head. The sour gas would be cleaned by capturing the hydrogen sulphide content. Embodiments also include cleaning gasses in industries such as the power generation industry, the metal production industry, cement production industry, fertiliser industry, petrochemical industry, biofuel production and mineral processing industry. In particular, embodiments can be used to clean gasses from cement production processes, blast furnace processes, steel production processes and reforming processes (e.g. for hydrogen production).

All of the components of the gas capture system of embodiments are scalable such that implementations of embodiments are appropriate for small, medium and large industrial scale processes. For example, implementations of embodiments may be used to clean flue gas from small to medium scale engines. Larger implementations of embodiments may be used to clean flue gas from a power plant/station.

Another preferred application of embodiments is in a hydrogen production process. It is known for hydrogen to be produced by sorption-enhanced reforming, SER, and/or by a water gas shift process. These processes may convert methane and steam to a gas mixture comprising hydrogen and carbon dioxide. Embodiments improve on known techniques for separating the generated hydrogen and carbon dioxide in order to obtain substantially pure hydrogen.

In the second to fourth embodiments, steam is fed into the second reactor system 102 with the sorbent. The steam may be generated by any available components with suitable heat. For example, heat from compressors and vacuum pumps may be used to heat water to generate the steam. The steam may additionally, or alternatively, be generated from excess heat in the system that generates the gas mixture, for example flue gas, that is received and cleaned by the first reactor system 101.

The second to fourth embodiments also include the use of other gasses than steam as the gas that is fed into the second reactor system 102 with the sorbent.

In the fourth embodiment, the gas capture system is described as operating with a CHP plant. Embodiments include the gas capture system operating with other types of power plant than a CHP plant.

Embodiments include the lock hopper in the first sorbent transfer system comprising a gas inlet for receiving a gas for driving the sorbent out of the lock hopper. The gas may be steam. The lock hopper gas inlet may be provided in addition to, or instead of, the steam inlets 313, 403.

Embodiments include the lock hopper in the second sorbent transfer system comprising a gas inlet for receiving a gas, from a gas conduit 309, for driving the sorbent out of the lock hopper. The gas may be air.

The first reactor system 101 may be a multistage fluidized bed. It may comprise perforated plates that allow the solid sorbent to flow down through the different stages counteracting a flue gas feed that is flowing upwards. The holes of the perforated plates may be large enough for the sorbent to flow down but small enough to maintain dense fluidization in each stage of the first reactor system 101.

In the second and fourth embodiments, a water driven heat exchanger at a temperature below that of the heat pump working fluid is used at an upper stage of the first reactor system 101 to further cool the sorbent. This may reduce the equilibrium carbon dioxide partial pressure and ensure maximum carbon dioxide removal from the flue gas. The heat recovery can be used for low pressure steam generation. The steam may be fed into the second reactor system 102 as described above.

In the third and fourth embodiments, water cooling may still used to remove heat from the top of the first reactor system 101 at a lower temperature of 40° C. (5° C. higher than in the second embodiment, to reduce the air cooler size with the higher ambient temperature). In the second embodiment, in the lower stages of the first reactor system 101, more heat may be removed by the heat pump working fluid to limit the temperature rise caused by the exothermic carbon dioxide and steam adsorption.

The second reactor system 102 may comprise three main parts. These may be:

A narrow pipe at the bottom where the sorbent fluidisation is driven by the released carbon dioxide (and steam if adsorbed on the sorbent) from sorbent regeneration under vacuum conditions, or under a partial pressure swing with low pressure steam raised from heat recovery.

A middle region with a larger diameter accommodating a heat exchanger of the heat pump transferring heat from the first reactor system 101 to the second reactor system 102.

An upper expanding region at the top where the gas decelerates letting the sorbent to settle and fall towards the lock hopper 301, 401 in the second sorbent transfer system. This part may also be connected to a downstream train comprising a vacuum pump 103, heat exchanger 407 for heat recovery, in addition to one or more compressors for carbon dioxide compression. Given that the sorbent flows upwards in the second reactor system 102 towards the expanding region, it will be exposed to the highest vacuum in the loop before being transferred to the first reactor system 101 for a new cycle. Such a feature ensures maximized adsorption working capacity.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A gas capture system comprising:

a first reactor system arranged so that, in the first reactor system, at least some gas in a gas stream that is received by the gas capture system is captured by a sorbent that is arranged to flow through the first reactor system, wherein a sorbent inlet of the first reactor system is located above a sorbent outlet of the first reactor system such that the direction of sorbent flow through the first reactor system is vertically downwards;

a second reactor system arranged to regenerate the sorbent so that the sorbent releases at least some of the gas captured in the first reactor system, wherein the sorbent is arranged to flow through the second reactor system and the second reactor system is arranged to output a flow of the released gas, wherein a sorbent inlet of the second reactor system is located below a sorbent outlet of the second reactor system such that the direction of sorbent flow through the second reactor system is vertically upwards;

a first sorbent transfer system arranged between the sorbent outlet of the first reactor system and the sorbent inlet of the second reactor system, wherein the first sorbent transfer system comprises a lock hopper;

a second sorbent transfer system arranged between the sorbent outlet of the second reactor system and the sorbent inlet of the first reactor system, wherein the second sorbent transfer system comprises a lock hopper; and a heat pump system arranged to transfer heat between the first reactor system and the second reactor system wherein:

the sorbent is a solid;

the second reactor system comprises a pump configured to reduce the pressure in the second reactor system so that the second reactor system has a lower operational pressure when regenerating sorbent than the operational pressure of the first reactor system during gas capture by the sorbent, wherein the pump is arranged to extract gas through a gas extraction outlet of the second reactor system and the gas extraction outlet is located such that there is a gas flow vertically upwards from the sorbent inlet end of the second reactor system;

the first reactor system, first sorbent transfer system, second reactor system and second sorbent transfer system are all arranged so that they provide a sorbent flow path that recirculates the sorbent vertically downwards through the first reactor system, through the first sorbent transfer system, vertically upwards through the second reactor system, and through the second sorbent transfer system; and the second reactor system is arranged to regenerate the sorbent by heating the sorbent with heat received from at least the heat pump system.

2. The gas capture system according to claim 1, wherein, in the first reactor system, the sorbent is in a substantial counter flow with the gas stream.

3. The gas capture system according to claim 1, wherein the first reactor system comprises a plurality of reactors configured to provide mass transfer between a gas stream and the sorbent;

the gas stream is arranged to flow through each reactor; and the sorbent is arranged to flow through each reactor.

4. The gas capture system according to claim 1, wherein the first reactor system comprises a counter current fluidised bed reactor.

5. The gas capture system according to claim 1, wherein the lock hopper of the second sorbent transfer system comprises:

an upstream valve;

a chamber; and a downstream valve;

wherein:

the upstream valve is arranged between the chamber and the sorbent outlet of the second reactor system;

the downstream valve is arranged between the chamber and the sorbent inlet of the first reactor system;

the lock hopper is operable so that when the upstream valve is open and the downstream valve is closed, sorbent is arranged to flow from the second reactor system into the chamber; and when the upstream valve is closed and the downstream valve is open, sorbent is arranged to flow from the chamber to the first reactor system; and wherein the lock hopper of the second sorbent transfer system further comprises a pump; and the lock hopper is operable so that when the upstream valve is closed and the downstream valve is closed, the pump removes at least some of the gas from the chamber.

6. The gas capture system according to claim 1, wherein the first heat pump system is arranged to recirculate a working fluid between a reaction region in the first reactor system and a regeneration region in the second reactor system such that heat is transferred from the reaction region to the regeneration region;

wherein the heat pump system comprises a compressor arranged to compress the recirculated working fluid.

7. The gas capture system according to claim 1, wherein the operational temperature of the second reactor system when the sorbent is regenerated is higher than the operation temperature of the first reactor system when the gas is captured.

8. The gas capture system according to claim 1, wherein the first reactor system is configured to react sorbent with the gas stream at an operational temperature in a range of about 40° C. to 90° C.; and wherein the second reactor system is configured to regenerate sorbent at an operational temperature in a range of about 60° C. to 130° C.

9. The gas capture system according to claim 1, wherein the operational pressure of the second reactor system is at least a partial vacuum.

10. The gas capture system according to claim 1, wherein:
the sorbent comprises one or more of polyethylenimine, a metal organic framework based sorbent, zeolite, activated carbon, 3D graphene, any substance for chemi-, phys-sorption and/or hydrids of these; and/or
the particle size of the sorbent is in the range 100 μm to 1000 μm.

11. The gas capture system according to claim 1, wherein the received gas stream by the gas capture system is a flue gas.

12. The gas capture system according to claim 1, wherein the received gas stream by the gas capture system is a gas mixture generated by a reforming process.

13. The gas capture system according to claim 1, wherein the gas captured by the sorbent is carbon dioxide.

14. The gas capture system according to claim 1, wherein the gas captured by the sorbent is one or more of hydrogen sulphide, SOx, hydrogen and NOx.

15. The gas capture system according to claim 1, wherein, in use, phase changes of the working fluid that is recirculated by the heat pump system occur in a reaction region in the first reactor system and/or in a regeneration region of the second reactor system; and
wherein, the phase changes of the working fluid occur at a substantially constant temperature.

16. The gas capture system according to claim 1, further comprising a steam inlet arranged to receive a flow of steam so that steam may be injected into the flow of sorbent that is received by the second reactor system; and
wherein, in use, heat in the first reactor system is used to generate steam that is injected into the flow of sorbent that is received by the second reactor system.

17. The gas capture system according to claim 1, further comprising a cooler arranged in the sorbent flow path between the lock hopper in the second sorbent transfer system and the first reactor system;
wherein the cooler is arranged to cool the sorbent in the sorbent flow path between the lock hopper in the second sorbent transfer system and the first reactor system.

18. The gas capture system according to claim 1, wherein the heat pump system is a first heat pump system and the gas capture system, further comprises a second heat pump system arranged to cool the gas output from the second reactor system; and
wherein the second heat pump system is arranged to provide heat for generating steam for injecting into the flow of sorbent that is received by the second reactor system.

19. The gas capture system according to claim 1, further comprising a control system for reconfiguring the operation of the gas capture system;
wherein:
the control system is arranged to vary the heat transfer from the first reactor system to the second reactor system; and/or
the control system is arranged to vary the pressure difference between the first reactor system and the second reactor system; and/or
the control system is arranged to vary the temperature difference between the first reactor system to the second reactor system; and/or
the control system is arranged to control the use of heat from the heat pump system for the generation of steam for injection into the flow of sorbent that is received by the second reactor system; and/or
the heat pump system is a first heat pump system and the gas capture system further comprises a second heat pump system, and the control system is arranged to control the use of heat from the second heat pump system for the generation of steam for injection into the flow of sorbent that is received by the second reactor system.

* * * * *